United States Patent
Sarnowski et al.

(10) Patent No.: US 9,743,653 B2
(45) Date of Patent: Aug. 29, 2017

(54) ADJUSTABLE DRAIN

(71) Applicant: GEM Products, Inc., Orange Park, FL (US)

(72) Inventors: Jason Sarnowski, Jacksonville, FL (US); Matthew Stewart Onorato, Jacksonville, FL (US); Benjamin Adam Wilder, Jacksonville, FL (US)

(73) Assignee: GEM Products, Inc., Orange Park, FL (US)

( * ) Notice: Subject to any disclaimer, the term of this patent is extended or adjusted under 35 U.S.C. 154(b) by 181 days.

(21) Appl. No.: 14/934,312

(22) Filed: Nov. 6, 2015

(65) Prior Publication Data
US 2017/0127658 A1 May 11, 2017

(51) Int. Cl.
*A01K 97/05* (2006.01)
*B63B 35/26* (2006.01)

(52) U.S. Cl.
CPC .............. *A01K 97/05* (2013.01); *B63B 35/26* (2013.01)

(58) Field of Classification Search
CPC . A01K 97/05; B63B 35/26; Y10T 137/86348; Y10T 137/86356; Y10T 137/9247; E03C 1/0415; E03C 1/2308; E03C 1/232
USPC ................................ 137/333; 251/9, 88, 310
See application file for complete search history.

(56) References Cited

U.S. PATENT DOCUMENTS

| | | | | |
|---|---|---|---|---|
| 458,997 | A | * 9/1891 | Clifford | E03C 1/232 4/681 |
| 3,078,612 | A | * 2/1963 | Wait | A01K 97/05 114/185 |
| 4,034,428 | A | * 7/1977 | Jacuzzi | A47K 1/14 210/166 |
| 4,777,676 | A | * 10/1988 | Ericson | E03C 1/232 4/286 |
| 4,926,507 | A | * 5/1990 | Craig | A47K 1/14 4/286 |
| 5,625,909 | A | * 5/1997 | Ericson | E03C 1/14 4/619 |
| 6,715,162 | B2 | * 4/2004 | Han | E03D 1/34 4/378 |
| 2004/0088782 | A1 | * 5/2004 | Antunez | E03D 5/092 4/378 |
| 2005/0285066 | A1 | * 12/2005 | Huang | F16K 3/265 251/215 |
| 2014/0157514 | A1 | * 6/2014 | Cook | E03F 5/0408 4/679 |
| 2015/0292662 | A1 | * 10/2015 | Majocka | E03F 5/0407 138/96 R |
| 2016/0122984 | A1 | * 5/2016 | Edmonds | E03C 1/2306 4/653 |

* cited by examiner

*Primary Examiner* — Craig Schneider
*Assistant Examiner* — Frederick D Soski
(74) *Attorney, Agent, or Firm* — Seyfarth Shaw LLP

(57) ABSTRACT

A drain system having a body adjustably coupled to a drain. The body can be rotated along its threads and engage a seal in the drain to substantially prevent water from flowing out of the drain. When rotated the opposite direction, the body can be spaced from the seal and allow water to flow out of the drain. The drain can also include holes that allow water to flow into the drain when the body is rotated so as to be spaced from the seal.

25 Claims, 7 Drawing Sheets

ADJUSTABLE DRAIN

TECHNICAL FIELD OF THE INVENTION

The present invention relates generally to drains. More particularly, the present invention relates to drains that are adjustably closed by adjusting a body.

BACKGROUND OF THE INVENTION

Live wells are water tanks found on many fishing boats. The tank includes water to keep fish and bait alive. The bait and fish release waste into the water of the live well, causing the water to become dirty and potentially unsafe for the fish and bait in the live well. Live wells accordingly include a feed system that adds and circulates fresh water within the live well and a drain system that removes stale water from the live well to keep the water in the live well circulating and as clean as possible. The feed and drain system constantly replaces the water in the live well to remove organic waste and keep a healthy habitat for the animals within the live well.

However, typical live well drain systems remove water only from the upper portion of the live well tank with an overflow drain, similar to a conventional sink or skimmer. As water is added by the feed system, the water level rises until it meets an overflow drain located near the top of the live well and attached to the drain system. The water then spills into the drain system through this hole, creating a generally consistent water level due to the incoming water from the feed system and the outgoing water from the overflow hole.

However, because fish and organic waste is typically denser than water, the water drained through the overflow hole at the top of the live well tank only removes a small portion of the waste and leaves the remaining waste in the bottom portion of the live well. The buildup of this waste causes the lower portion of the live well to become a toxic environment for the animals held within and can often cause the fish and bait to die or become unhealthy.

SUMMARY OF THE INVENTION

The present invention broadly comprises a drain system having a rotatable body adjustably coupled to a drain. The drain can include a seal that couples with the body when the drain is in the closed position where water is not being drained, and that is spaced from the body when the drain is in the open position where water is being drained. The drain can also include holes that allow water to flow into the drain when the drain is in the open position.

In an embodiment, the present invention broadly comprises a drain system including a drain cap having an opening and drain holes circumferentially disposed around the opening. A fitting is coupled to the drain cap and a seal is disposed between the fitting and the drain cap. The drain system can further include a body having opposing first and second ends, where the second end is adapted to extend through the opening and adjustably couple to the seal. The body can be further adapted to adjustably space from the seal at the second end to allow contents to flow through the fitting.

In another embodiment, the present invention broadly comprises a drain system including a drain cap having an opening and drain holes circumferentially disposed around the opening, a fitting coupled to the drain cap, a seal disposed between the fitting and the drain cap, an overflow cap, and a pipe having opposing first and second ends. The first end can be coupled to the overflow cap and the second end can be adapted to extend through the opening and adjustably couple to the seal. The pipe can further be adapted to adjustably space from the seal at the second end to allow contents to flow through the fitting.

In yet another embodiment, the present invention broadly comprises a drain system including a drain cap having an opening and drain holes circumferentially disposed around the opening, a fitting coupled to the drain cap, a seal disposed between the fitting and the drain cap, and a plug having opposing first and second ends. The first end can be adapted to be gripped and the second end can be adapted to extend through the opening and adjustably couple to the seal. The plug can be further adapted to adjustably space from the seal at the second end to allow contents to flow through the fitting.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
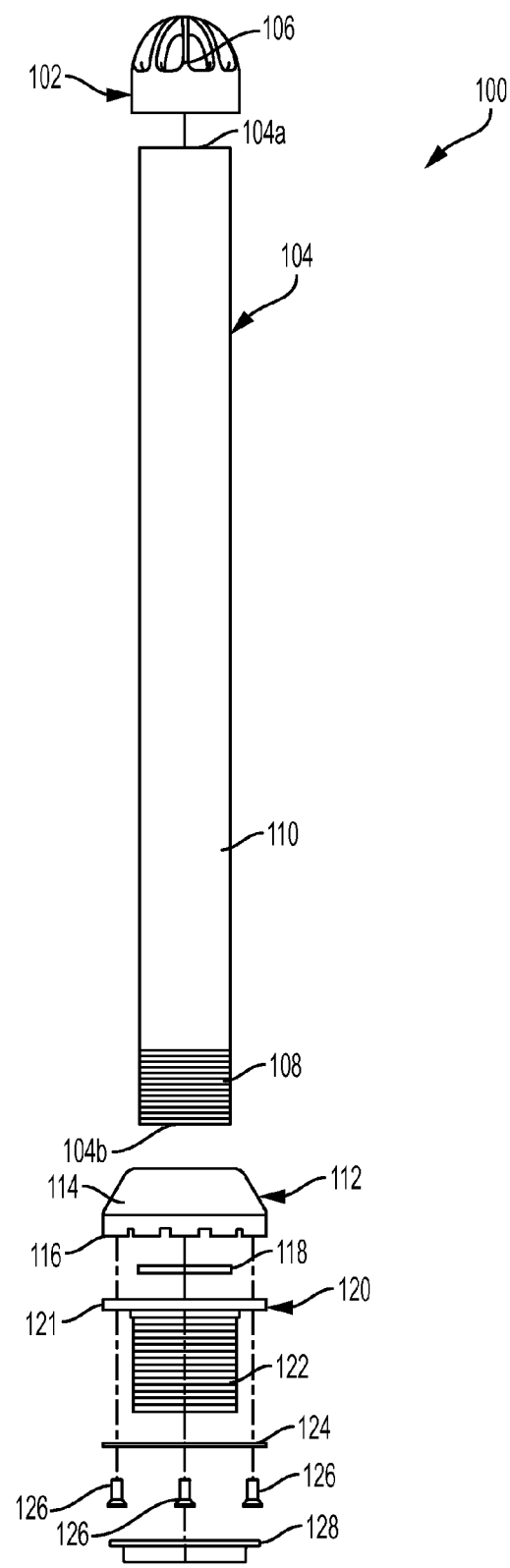
FIG. 1 is an exploded, side elevation view of a drain system according to an embodiment of the present invention.

While this invention is susceptible of embodiments in many different forms, there is shown in the drawings, and will herein be described in detail, a embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

An embodiment of the present invention broadly comprises a drain system having a body adjustably coupled to a drain that is intended for use in a tank or container that contains water or another fluid. The lower portion of the body can engage a seal within the drain and substantially prevent water from exiting a tank or container via the drain.

The drain can also include holes that allow water to flow into the drain and out of the container when the body is spaced from the seal.

Figure 2:
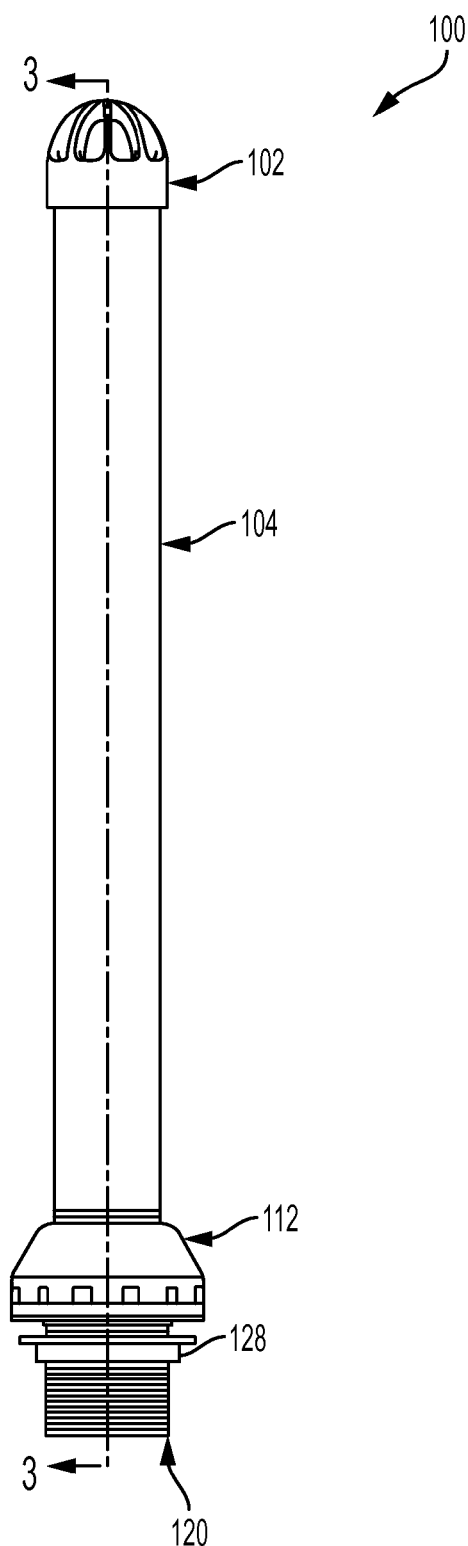
FIG. 2 is an assembled, side elevation view of a drain system according to an embodiment of the present invention.
Figure 3:
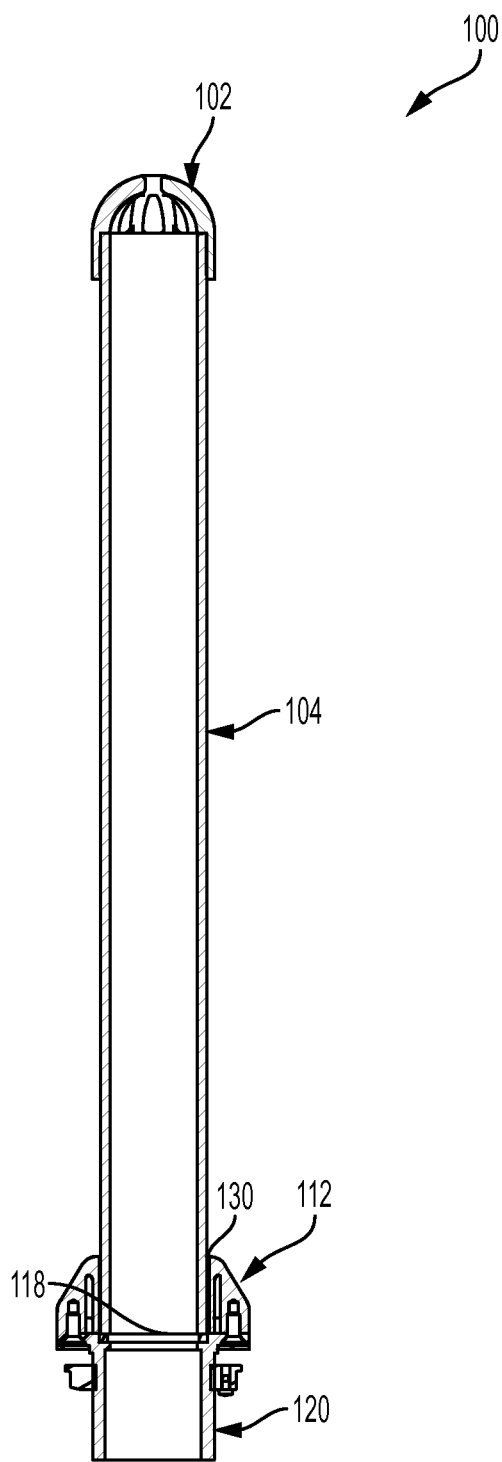
FIG. 3 is a side sectional view of the drain system of FIG. 2, as viewed along line 3-3 of FIG. 2.
Figure 4:
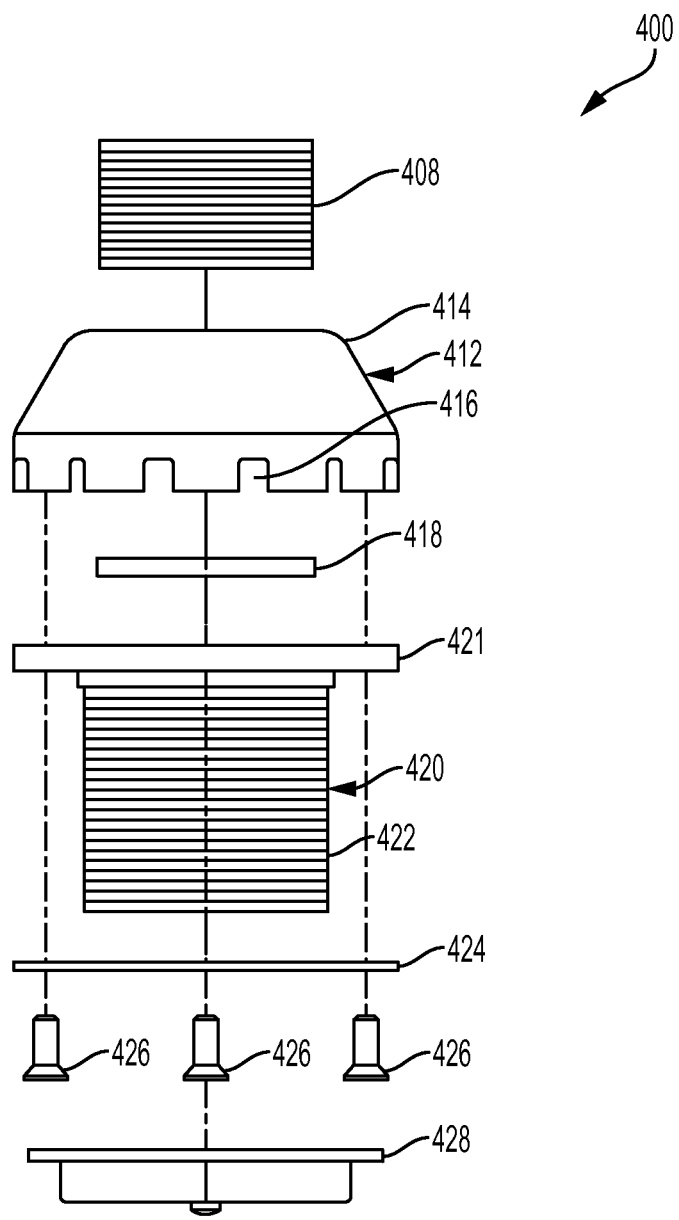
FIG. 4 is an exploded, side elevation view of a plug embodiment of a drain system, according to an embodiment of the present invention.
Figure 5:
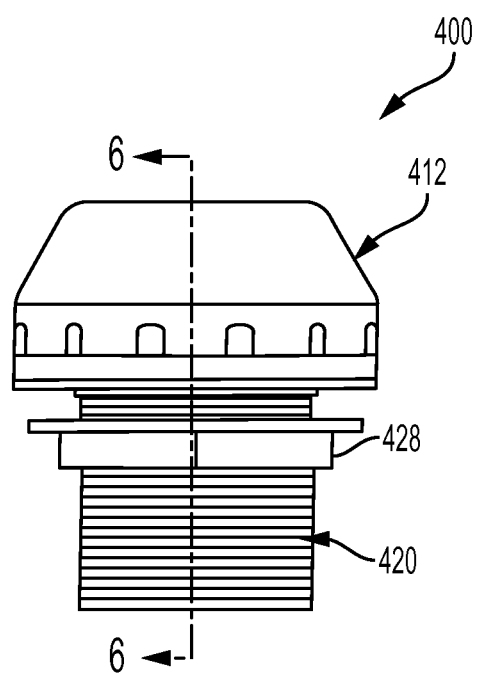
FIG. 5 is an assembled, side elevation view of the plug of FIG. 4.
Figure 6:
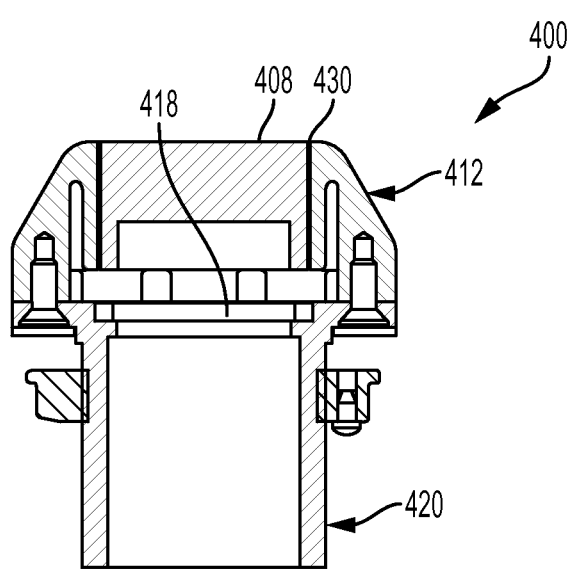
FIG. 6 is a side sectional view of the plug of FIG. 4, as viewed along line 6-6 of FIG. 5.

As shown in FIGS. 1-3, a drain system 100 includes an overflow cap 102 coupled to a pipe 104 at a first end 104a of the pipe 104 opposite a second end 104b of the pipe 104. The overflow cap 102 can include circumferentially spaced ribs 106 forming spaces therebetween that allow water or other liquids to flow into the pipe 104 via the overflow cap 102, but filter objects larger than the spaces from entering the pipe 104. The overflow cap 102 can therefore act as an overflow drain in, for example, a live well tank. Water can be fed into the container through conventional water feeding means, and when the water level rises accordingly, can flow into the overflow cap 102 and through the pipe 104, eventually draining from the tank. The overflow cap 102 can be coupled to the pipe 104 by a friction fit, or with adhesive, fasteners, or any other known coupling means.

The pipe 104 can include a threaded pipe portion 108 with threads at the second end 104b, and a pipe body 110 extending between the opposing first 104a and second 104b ends. The threaded pipe portion 108 can couple with a drain cap 112 through threaded or other adjustable means. The drain cap 112 can also include a drain body 114 with circumferentially spaced drain holes 116 positioned at the bottom of the drain cap 112 opposite the threaded pipe portion 108. A seal 118 can be disposed within a fitting 120 having a fitting base 121 and a fitting threaded section 122 extending from the fitting base 121. A gasket 124 can be disposed proximate the fitting base 121 on an opposite side of the fitting base 121 as the drain cap 112. Fasteners 126 can couple the fitting base 121 and drain cap 112 together, along with any other components of the system 100. A nut 128 can further couple the fitting 120 to a working surface, for example, the bottom portion of a live well tank or other liquid-holding container.

The second end 104b of the pipe 104 can be planar and can engage with the seal 118 when adjusted accordingly. For example, the pipe 104 can be rotated and the threaded pipe portion 108 can accordingly shift to a higher or lower axial position within the drain cap 112 by rotating within drain threads 130 proximate an opening of the drain cap 112, as shown in FIG. 3, or through any other adjustable mechanism. The second end 104b of the pipe 104 can therefore substantially seal the drain system 100, other than at the overflow cap 102, when in the closed position, i.e., when the second end 104b engages the seal 118.

In the closed position, water can only exit the system by entering the pipe 104 via the overflow cap 102, flowing through the pipe 104 and exiting out of the system 100 through the fitting threaded section 122. The second pipe end 104b can seal the system 100 at the seal 118 by extending through an opening of the drain cap 112 and engaging the seal 118 in the closed position. Water can still enter the drain holes 116 in the closed position, but the water will be blocked from further drainage by the threaded pipe portion 108 and the fitting base 121. For example, water is substantially prevented from exiting the system 100 in the closed position in areas other than the overflow cap 102 because drainage through the fitting threaded section 122 is prevented by the second end 104b/seal 118 engagement, and drainage elsewhere is prevented by the container holding the water. The fitting base 121 and gasket 124 provide a further seal in the installation opening of the container that allows installation of the drainage system 100.

When adjusted to disengage the seal 118, i.e., in the open position, water can flow into the drain holes 116 and out of the system 100 via the fitting threaded section 122. For example, because the second pipe end 104b disengages the seal 118, water can flow into the drain holes 116, between the seal 118 and second end 104b, and exit the system through the fitting threaded section 122. Water can also exit the system 100 via the overflow cap 102 while the system 100 is in the open position. When the water is quickly drained via the drain cap 112, the drainage from the overflow cap 102 is likely to end after a short time when the water level of the container descends below the first end 104a of the pipe 104 and below the overflow cap 102. However, the user could also operate the system 100 in the open position and slowly drain water via the drain cap 112, in which case the water level could be slightly above the overflow cap 102 and water could still drain from the overflow cap 102. In this latter scenario, waste could be drained from the system 100 without affecting the water level of the tank.

The pipe 104 can be any size and can be cut or adjusted to account for different sized tanks or containers. For example, the system 100 can be provided with a pipe 104 having a longer length, and the user can cut the pipe 104 at the top end 104a to account for a smaller container or tank.

The seal 118 can be any material or any seal that provides a substantially liquid-tight seal by engagement with the second end 104b of the pipe 104. The seal 118 can be elastomeric rubber or any other type of polymer, for example. Also, the seal 118 can be any size or shape that engages the second end 104b to cause a substantially liquid-tight seal between the second end 104b and the seal 118. For the purposes of discussion only, and not by limitation, the seal 118 can be an O-ring.

As discussed above, the gasket 124 can further seal the system 100 at an installation hole in a container where the system 100 is installed. For example, the gasket 124 can fit around the fitting threaded section 122 and seal the system 100 by engaging a bottom wall of the container or tank at the first side, and engaging the fitting base 121 at the second side opposite the first side. The gasket 124 can be omitted, or can be replaced with another suitable sealant, as desired by the user.

The drain holes 116 allow liquid to flow from the container and out of the system 100 through the fitting 120, when in the opened position. As shown, the drain holes 116 are circumferentially spaced around a bottom portion of the drain cap 112 and extending to the fitting base 121. However, the drain holes 116 can be any size that allow liquid to flow from the container through the system 100.

The drain holes 116 can also act as a filter for larger objects, for example, bait or small fish within a live well. For example, the user can adjust the pipe 104 slightly to disengage the second end 104b from the seal 118, allowing water to flow in the open position. The water can accordingly flow through the fitting threaded section 122 and pull dense objects downwardly in the tank towards the drain holes 116. The user can then retrieve the larger objects at the drain holes 116 rather than having such objects clog the fitting threaded section 122 or other downstream components.

The fitting threaded section 122 can be any cylindrical or hollow device that allows water or liquid to flow out of the system. The fitting threaded section 122 need not be threaded at all, and instead can be any object that is hollow and that couples to other objects of the system 100 through means other than a threaded connection. The fitting threaded section 122 can therefore be more generally referred to as a hollow portion of the fitting, regardless of whether the hollow portion is threaded.

As discussed above, the second end 104b of the pipe 104 can be threadably coupled to the drain cap 112 at drain threads 130 within the drain cap 112. However, the second end 104b can alternately be coupled to the drain cap 112 using any known adjustable means, for example, a ball detent system, notches, an adjustable friction-fit, or any other adjustable means.

FIGS. 4-7 illustrate another embodiment of the present invention that operates in substantially the same manner as the embodiment illustrated in FIGS. 1-3. As shown, the system 400 includes a body 408 coupled to a drain top 412 with a drain body 414 and drain holes 416. The body 408 engages with a seal 418, similar to the second end 104b coupling with the seal 118 of FIGS. 1-3. The seal 418 can sit within a fitting 420 having a fitting base 421 a one end, and a fitting threaded section 422 extending toward an opposite end. The system 400 can also include a gasket 424, fasteners 426, and nut 428 that operate substantially the same as the gasket 124, fasteners 126, and nut 128 of the embodiment of FIGS. 1-3. The system 400 further includes drain threads 430 within the drain top 412 proximate an opening of the drain top 412, also similar to the embodiment of FIGS. 1-3.

The embodiment of FIGS. 4-7 differs from that of FIGS. 1-3 in that the system 400 need not include any overflow cap 102 or pipe 104 coupled to the drain top 412. Instead, the system 400 can include a plug-type structure that includes the body 408 adjustably coupled to the drain top 412 in any manner. Alternately, the system 400 can include any other structure having a body 408 disposed thereon and adjustably coupled to the drain top 412.

Figure 7:
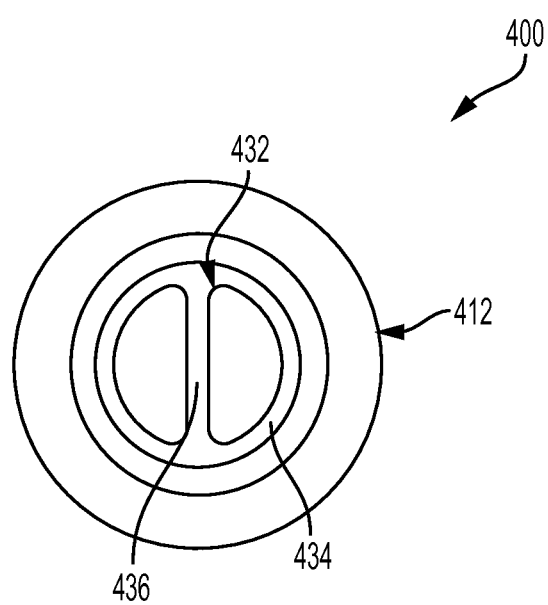
FIG. 7 is a top plan view of the plug of FIG. 4.

As shown in FIG. 7, the system 400 can include a plug 432 having a plug base 434 and a handle 436. For example, the plug 432 can include the body 408 and can be adjustably coupled to the drain top 412 via threads or other adjustment means. The plug base 434 can be a circular ring, as shown, or can be any other base structure. Similarly, the handle 436 can be any structure that allows a user to rotate the plug base 434 and, accordingly, the plug 432 itself. As shown, the handle can be a straight rib-type structure that couples to the plug base 434 and allows a user to grip the plug 432 with the user's fingers.

The body 408 operates in substantially the same manner as the threaded pipe portion 108 of FIGS. 1-3. That is, when the body 408 is rotated within the drain threads 430 or otherwise adjustably moved axially within the drain 412, water can enter through the drain holes 416 and exit the system 400 through the fitting threaded section 422. Conversely, when the body 408 engages the seal 418, water can enter through the drain holes 416 but is blocked from exiting the system 400 by the substantial seal caused by the body 408 and seal 418 engagement.

As discussed herein, the term "body" has been used to denote the exemplary embodiments having the body 408 of FIGS. 4-7. However, the term "body" can generically refer to either the body 408 of FIG. 4-7 or the fitting threaded section 122 of FIG. 1-3, or any other structure that can operate as the second end 104b of the pipe 104. The body 108, 408 need not be threaded, and need only be adjustable so that a seal can be caused between the body 108, 408 and the seal 118, 418.

The term "substantially sealed" is used throughout this application to define a seal that is water-tight or air-tight under normal operating conditions, but recognizes that certain defects may limit a complete seal in the system 100, 400 and/or the container in which the system is installed. For example, the container could include a crack that allows water or gas to leak, thereby preventing the "seal" from forming throughout the entire container. The term "substantially sealed" recognizes these realistic possibilities.

The invention is discussed herein with examples relating to live wells. However, it should be appreciated that the invention can be implemented with any container capable of holding a liquid or gas and that can benefit from a drainage system. For the purposes of clarity, the present invention is not limited to a live well configuration, and can be implemented in any container system.

As discussed above, the container or live well can hold water. However, any liquid can be implemented without departing from the spirit and scope of the present invention. The container can also hold a gas, and the drainage system 100, 400 discussed herein can pull the gas towards the system 100, 400 by implementing a lower pressure system below the drainage system 100, 400. Any other form of liquid or gas system can be implemented without departing from the spirit and scope of the present invention.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A drain system comprising:
a drain cap having an opening and drain holes circumferentially disposed around the opening;
a fitting coupled to the drain cap;
a seal disposed between the fitting and the drain cap; and
a body having opposing first and second ends, the second end adapted to extend through the opening and adjustably engage with the seal, the body further adapted to be adjustably spaced from the seal at the second end to allow contents to flow through the fitting.

2. The drain system of claim 1, wherein the body includes body threads and is threadably coupled to the drain cap.

3. The drain system of claim 1, wherein the body is a pipe coupled to an overflow cap at the first end and having a threaded pipe portion at the second end coupled to the drain cap.

4. The drain system of claim 3, wherein the overflow cap includes ribs circumferentially disposed thereon and adapted to filter objects from entering the pipe.

5. The drain system of claim 1, wherein the body is a plug.

6. The drain system of claim 5, wherein the plug includes a plug base and a handle coupled to the plug base.

7. The drain system of claim 5, wherein the plug includes threads that are threadably coupled to the drain cap for adjustable axial placement relative to the drain cap.

8. The drain system of claim 1, wherein the fitting includes a fitting base and a hollow portion extending from the fitting base opposite the seal.

9. The drain system of claim 8, wherein the hollow portion includes fitting threads.

10. The drain system of claim 9, further comprising a nut coupled to the fitting threads.

11. The drain system of claim 1, wherein the seal is an O-ring.

12. A drain system for a tank comprising:
   a drain cap having an opening and drain holes circumferentially disposed around the opening;
   a fitting coupled to the drain cap;
   a seal disposed between the fitting and the drain cap;
   an overflow cap; and
   a pipe having opposing first and second ends, the first end coupled to the overflow cap and the second end adapted to extend through the opening and engage with the seal, the pipe further adapted to be adjustably spaced from the seal at the second end to allow contents in the tank to flow through the fitting.

13. The drain system of claim 12, wherein the second end includes pipe threads and is threadably coupled to the drain cap for axial adjustment relative to the seal.

14. The drain system of claim 12, wherein the cap includes ribs circumferentially disposed thereon and adapted to filter objects in the contents of the tank from entering the pipe.

15. The drain system of claim 12, wherein the fitting includes a fitting base and a hollow portion extending from the fitting base opposite the seal.

16. The drain system of claim 12, wherein the hollow portion includes fitting threads.

17. The drain system of claim 16, further comprising a nut coupled to the fitting threads.

18. The drain system of claim 12, wherein the seal is an O-ring.

19. A drain system comprising:
   a drain cap having an opening and drain holes circumferentially disposed around the opening;
   a fitting coupled to the drain cap;
   a seal disposed between the fitting and the drain cap; and
   a plug having opposing first and second ends, the first end adapted to be gripped and the second end adapted to extend through the opening and adjustably engage with the seal, the plug further adapted to be adjustably spaced relative to the seal at the second end to allow contents to flow through the fitting.

20. The drain system of claim 19, wherein the plug includes a plug base and a handle coupled to the plug base.

21. The drain system of claim 20, wherein the plug includes threads threadably coupled to the drain top for adjustable coupling with the drain top.

22. The drain system of claim 19, wherein the fitting includes a fitting base and a hollow portion extending from the fitting base opposite the seal.

23. The drain system of claim 22, wherein the hollow portion includes fitting threads.

24. The drain system of claim 23, further comprising a nut coupled to the fitting threads.

25. The drain system of claim 19, wherein the seal is an O-ring.

* * * * *